United States Patent
Hashimoto et al.

(10) Patent No.: US 12,321,797 B2
(45) Date of Patent: Jun. 3, 2025

(54) IMAGE PROCESSING APPARATUS AND IMAGE PROCESSING METHOD WITH IMAGE ROTATION

(71) Applicant: Toshiba Tec Kabushiki Kaisha, Tokyo (JP)

(72) Inventors: Yoshitaka Hashimoto, Mishima Shizuoka (JP); Kazunori Hirabayashi, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/188,213

(22) Filed: Mar. 22, 2023

(65) Prior Publication Data

US 2024/0320458 A1    Sep. 26, 2024

(51) Int. Cl.
*G06K 15/02*        (2006.01)

(52) U.S. Cl.
CPC ....... *G06K 15/1843* (2013.01); *G06K 15/024* (2013.01)

(58) Field of Classification Search
None
See application file for complete search history.

(56) References Cited

U.S. PATENT DOCUMENTS

| | | | | |
|---|---|---|---|---|
| 5,220,431 | A | * | 6/1993 | Yamagguchi .......... H04N 1/233 358/1.18 |
| 2002/0057470 | A1 | * | 5/2002 | Koide .................. H04N 1/4015 358/513 |
| 2006/0159350 | A1 | * | 7/2006 | Watanabe .............. H04N 19/60 375/E7.176 |
| 2014/0209595 | A1 | * | 7/2014 | Hatakeyama ............. B32B 7/12 219/385 |
| 2015/0341515 | A1 | * | 11/2015 | Youda .................. G03G 15/602 358/498 |
| 2021/0303947 | A1 | * | 9/2021 | Yoshida ............... G06K 15/002 |

FOREIGN PATENT DOCUMENTS

| | | | |
|---|---|---|---|
| JP | H06-189061 | * | 7/1994 |
| JP | H06-189061 A | | 7/1994 |
| JP | 2022-092755 | * | 6/2022 |
| JP | 2022092755 A | * | 6/2022 |

* cited by examiner

*Primary Examiner* — Akwasi M Sarpong
*Assistant Examiner* — Pawan Dhingra
(74) *Attorney, Agent, or Firm* — FOLEY & LARDNER LLP

(57) ABSTRACT

An image processing apparatus includes an interface and a processor. The interface acquires printing data including an image. If length in a longitudinal direction of the image is larger than a printing width of a medium on which the image is printed, the processor rotates the image.

11 Claims, 4 Drawing Sheets

PRINTING DATA

IMAGE PROCESSING APPARATUS AND IMAGE PROCESSING METHOD WITH IMAGE ROTATION

FIELD

Embodiments described herein relate generally to an image processing apparatus and an image processing method.

BACKGROUND

A label printer (an image forming apparatus) is known that prints an image on a label formed in a belt shape. As such a label printer, there is a label printer that prints, using a PDF (Print Document Format) as a PDL (Page Description Language), an image on the label formed in the belt shape.

Since information for controlling the label printer is not included in the PDF, the label printer sometimes cannot appropriately determine a direction of the image on the label. Therefore, in some cases, the image is partly cut off or the image is excessively reduced in size.

An object of at least one embodiment is to provide an image processing apparatus and an image processing method that can appropriately rotate an image.

DETAILED DESCRIPTION

According to at least one embodiment, an image processing apparatus includes an interface and a processor. The interface acquires printing data including an image. If a length of the image in a longitudinal direction is larger than a printing width of a medium on which the image is printed, the processor rotates the image.

The embodiment is explained below with reference to the drawings.

An image forming system according to the embodiment includes a label printer (an image processing apparatus). The label printer prints an image on a medium (a label) using a PDF generated for page printers. The label printer prints the image on a belt-like medium having a predetermined width. The label printer rotates the image based on an image or the like included in the PDF. The label printer prints the rotated image on the medium.

Figure 1:
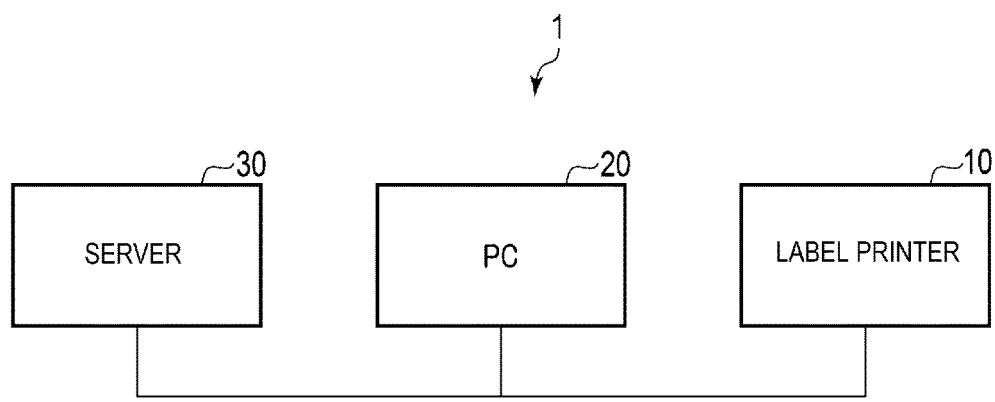
FIG. 1 is a block diagram illustrating a configuration example of an image forming system according to at least one embodiment.

FIG. 1 illustrates a configuration example of an image forming system 1 according to at least one embodiment. As illustrated in FIG. 1, the image forming system 1 includes a label printer 10, a PC 20, and a server 30. The label printer 10, the PC 20, and the server 30 are connected to one another.

The PC 20 transmits printing data (a PDF) including an image to the label printer 10 according to operation or the like of an operator. The printing data is data generated for page printers. For example, the PC 20 transmits the printing data to the label printer 10 through a LAN (Local Area Network).

The server 30 transmits printing data to the label printer 10 according to operation or the like of the operator. For example, the PC 20 may transmit the PDF to the label printer 10 through an external network such as the Internet.

The label printer 10 prints an image on a medium based on the printing data transmitted from the PC 20 or the server 30.

Figure 2:
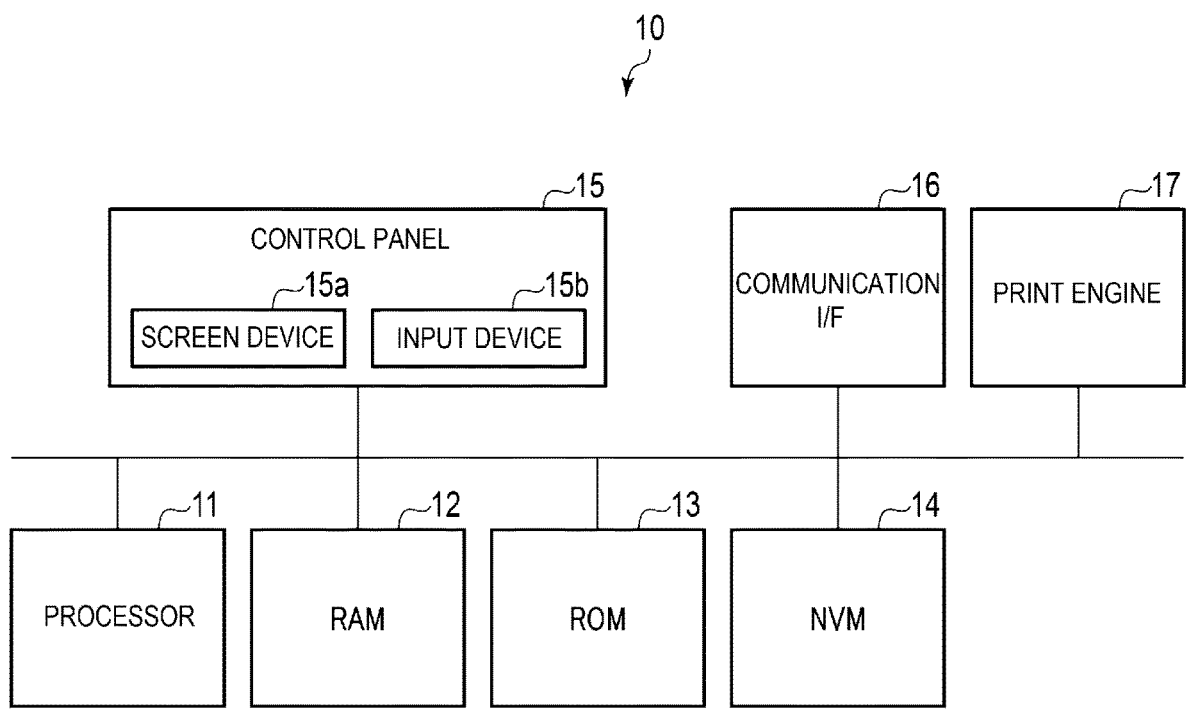
FIG. 2 is a block diagram illustrating a configuration example of a label printer according to at least one embodiment.

FIG. 2 illustrates a configuration example of the label printer 10 according to at least one embodiment. As illustrated by FIG. 2, the label printer 10 includes a processor 11, a RAM 12, a ROM 13, an NVM 14, a control panel 15, a communication interface 16, and a print engine 17. The processor 11 is connected to the RAM 12, the ROM 13, the NVM 14, the control panel 15, the communication interface 16, and the print engine 17 via a data bus or the like.

The label printer 10 may further include components corresponding to needs in addition to the components illustrated in FIG. 2. Specific components may be excluded from the label printer 10.

The processor 11 has a function of controlling an operation of the entire label printer 10. The processor 11 may include an internal cache and various interfaces. The processor 11 executes programs stored in advance by the internal memory, the ROM 13, or the NVM 14 to realize various functions.

A part of the various functions realized by the processor 11 executing the programs may be realized by a hardware circuit. In this case, the processor 11 controls the functions executed by the hardware circuit.

The RAM 12 is a volatile memory. The RAM 12 temporarily stores data being processed by the processor 11. The RAM 12 stores various application programs based on instructions received from the processor 11. The RAM 12 may store data necessary for execution of the application programs, execution results of the application programs, and the like.

The ROM 13 is a nonvolatile memory in which control programs, control data, and the like are stored in advance. The control programs and the control data stored in the ROM 13 are incorporated in advance according to the specifications of the label printer 10.

The NVM 14 is a nonvolatile memory in which data writing and rewriting are possible. The NVM 14 is configured from, for example, a HDD (Hard Disk Drive), an SSD (Solid State Drive), or a flash memory. The NVM 14 stores control programs, applications, various data, and the like according to operation uses of the label printer 10.

Various instructions are input to the control panel 15 from the operator of the label printer 10. The control panel 15 displays various kinds of information to the operator of the label printer 10.

The control panel 15 is configured from a screen device 15a and an input device 15b.

The screen device 15a displays information based on control by the processor 11. For example, the screen device 15a is configured from a liquid crystal monitor.

Various kinds of operations are input to the input device 15b from the operator. The input device 15b transmits a signal indicating the input operation to the processor 11. The input device 15b is configured from a touch panel or the like. The input device 15b functioning as the touch panel is configured integrally with the screen device 15a.

The communication interface 16 is an interface for connection to an external apparatus such as the PC 20 or the server 30. The communication interface 16 transmits and receives data to and from the external apparatus via a predetermined network. For example, the communication interface 16 supports wired or wireless LAN connection.

The print engine 17 (a printer) prints printing data on a label (paper) based on control of the processor 11.

The label is a belt-like medium having a predetermined width. The label is variable in a first direction (here, a longitudinal direction) and has the predetermined width in a second direction (here, a lateral direction) orthogonal to the first direction. For example, the label is stored in the print engine 17 in a state in which the label is wound in a roll shape. The label may be a sticker.

The print engine 17 draws out, according to control of the processor 11, a leading end from the label wound in the roll shape. The print engine 17 prints an image from the leading end toward the trailing end of the drawn-out label. The print engine 17 prints the image on the label while drawing out the label. That is, the print engine 17 prints the image on the label variable in a direction in which the belt extends.

For example, the print engine 17 prints image data on paper using an electrophotographic system. The print engine 17 is configured from, a transfer body, a photoconductive drum that transfers a toner image onto the transfer body, a transfer roller that transfers the toner image from the transfer body onto the paper, a heater that heats the paper on which the toner image is transferred, and the like.

The print engine 17 prints image data on paper using an inkjet system.

The label may be heat sensitive paper. In this case, the print engine 17 heats the label and prints an image on the label.

A printing method of the print engine 17 is not limited to a specific configuration.

The print engine 17 may include a cutter that cuts a printed label. For example, if printing is completed, the print engine 17 cuts the label at the trailing end of an image using the cutter. The print engine 17 may have structure in which the operator pulls the label, whereby the label is cut by the cutter.

Subsequently, functions realized by the label printer 10 are explained. The functions realized by the label printer 10 are realized by the processor 11 executing programs stored in the internal memory, the ROM 13, or the NVM 14.

First, the processor 11 has a function of acquiring printing data (a PDF) generated for page printers.

For example, the processor 11 acquires printing data from the external apparatus such as the PC 20 or the server 30 through the communication interface 16.

For example, the printing data is configured in a layout for printing an image on paper of a size such as A3 or A4.

The processor 11 has a function of determining whether an image included in the acquired printing data is landscape (lateral).

For example, the processor 11 acquires a lateral width and a longitudinal width of the image included in the printing data. After acquiring the lateral width and the longitudinal width, the processor 11 determines whether the lateral width is larger than the longitudinal width. If determining that the lateral width is larger than the longitudinal width, the processor 11 determines that the image included in the printing data is landscape. If determining that the lateral width is equal to or smaller than the longitudinal width, the processor 11 determines that the image included in the printing data is portrait (longitudinal).

The processor 11 has a function of, if the image is landscape, determining whether to rotate the image based on a printing width (width of a region where the image can be printed) of the label.

If determining that the image is landscape, the processor 11 acquires the printing width of the label. The printing width is width of a region printable in the second direction.

After acquiring the printing width of the label, the processor 11 compares the lateral width (length in the longitudinal direction) of the image and the printing width of the label. If the lateral width of the image is larger than the printing width of the label, the processor 11 determines to rotate the image. If determining to rotate the image, the processor 11 rotates the image included in the printing data in the right direction or the left direction by 90°.

If the lateral width of the image is equal to or smaller than the printing width of the label, the processor 11 determines not to rotate the image.

The processor 11 has a function of enlarging or reducing, based on the printing width of the label, the image included in the printing data.

First, a case in which the image is not rotated (including a case in which the image is portrait) is explained.

Figure 3:
FIG. 3 is a diagram illustrating an operation example of the label printer.
Figure 3:
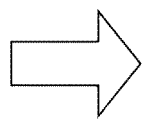
Figure 3:

FIG. 3 illustrates an operation example in the case in which the image is not rotated. FIG. 3 illustrates printing data and a label 18 on which the image is printed.

The processor 11 enlarges or reduces the image based on the lateral width of the image and the printing width of the label.

For example, if the lateral width of the image is larger than the printing width of the label, the processor 11 reduces the image to fit in the label.

If the lateral width of the image is smaller than the printing width of the label, the processor 11 may enlarge the image according to the printing width of the label.

If the lateral width of the image matches the printing width of the label, the processor 11 may not enlarge or reduce the image.

Subsequently, a case in which the image is rotated is explained.

Figure 4:
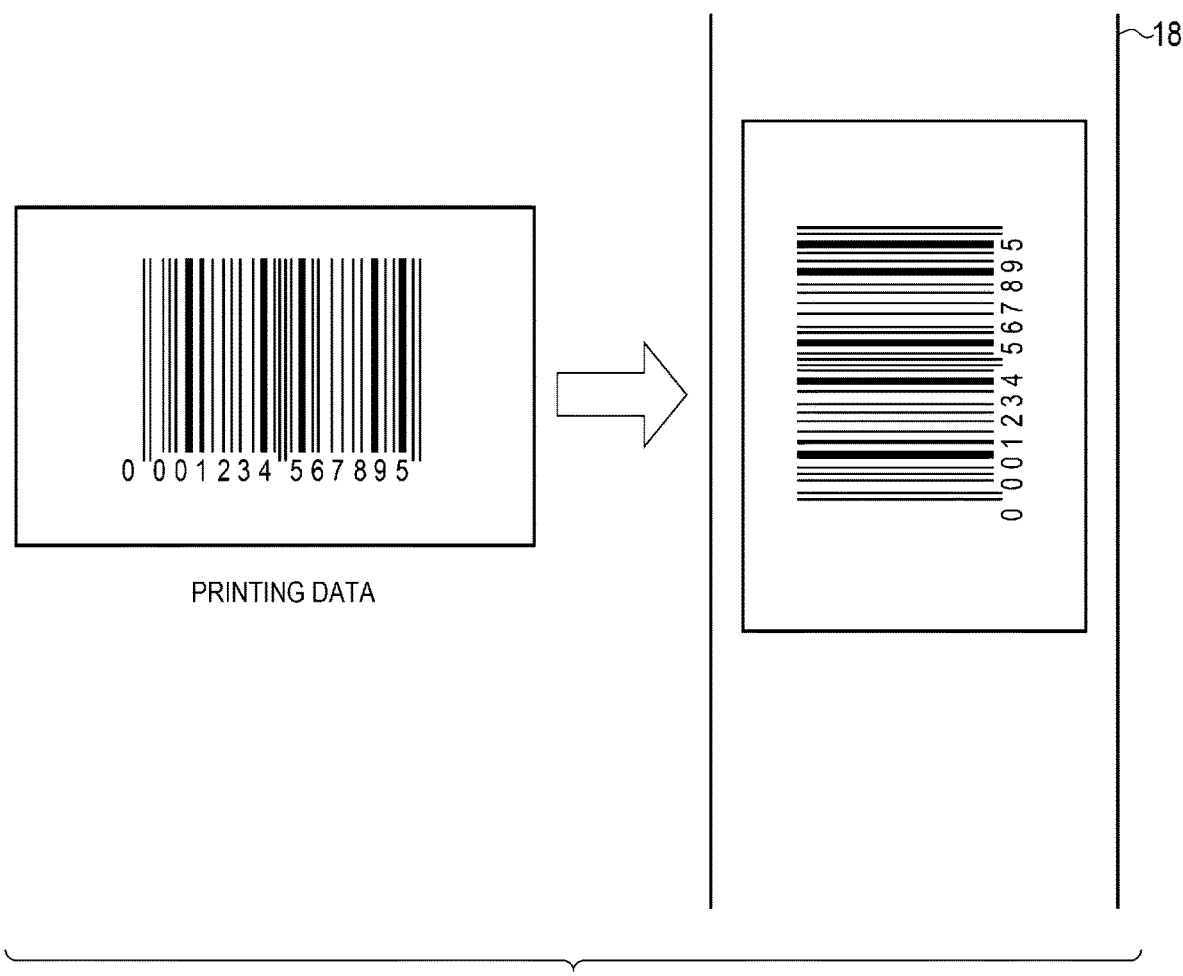
FIG. 4 is a diagram illustrating an operation example of the label printer.

FIG. 4 illustrates an operation example in the case in which the image is rotated. FIG. 4 illustrates the printing data and the label 18 on which the image is printed.

The processor 11 enlarges or reduces the image based on the longitudinal width (the lateral width after the rotation) of the image and the printing width of the label.

For example, if the longitudinal width of the image is larger than the printing width of the label, the processor 11 reduces the image to fit in the label.

If the longitudinal width of the image is smaller than the printing width of the label, the processor 11 may enlarge the image according to the printing width of the label.

If the longitudinal width of the image matches the printing width of the label, the processor 11 may not enlarge or reduce the image.

The processor 11 has a function of printing the enlarged or reduced image on the label 18 using the print engine 17.

After enlarging or reducing the image included in the printing data, the processor 11 prints the enlarged or reduced image on the label 18 using the print engine 17.

For example, the processor 11 draws out the roll-like label 18 using the print engine 17. After drawing out the label 18, the processor 11 prints the image from the leading end toward the trailing end of the label 18 using the print engine 17. After printing the image, the processor 11 discharges, using the print engine 17, the label 18 on which the image is printed.

Subsequently, an operation example of the label printer 10 is explained.

Figure 5:
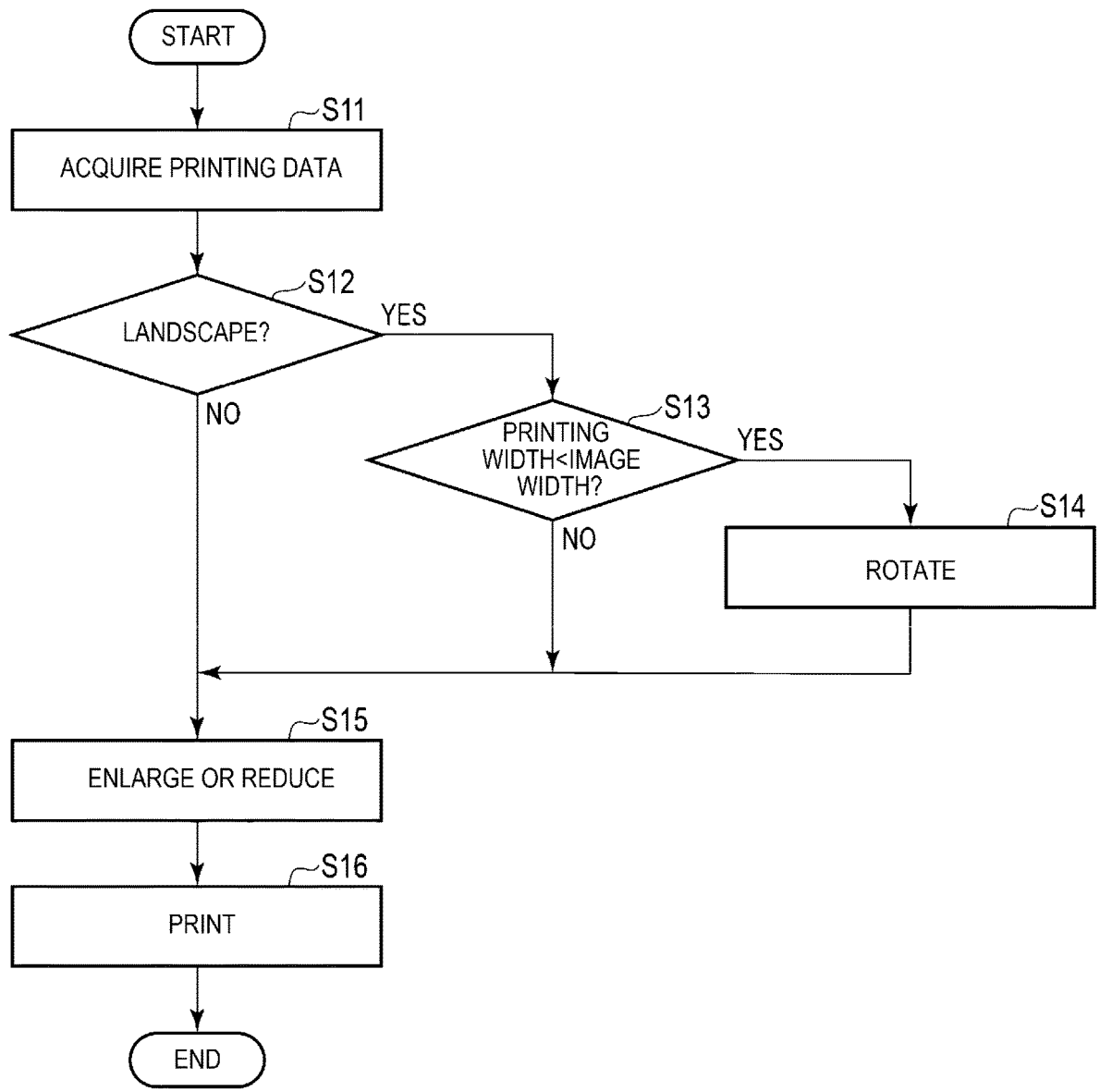
FIG. 5 is a flowchart illustrating an operation example of the label printer.

FIG. 5 is a flowchart for explaining the operation example of the label printer 10.

First, the processor 11 of the label printer 10 acquires printing data from the external apparatus through the communication interface 16 (Act 11). After acquiring the printing data, the processor 11 determines whether an image included in the image data is landscape (Act 12).

If determining that the image included in the printing data is landscape (YES in Act 12), the processor 11 determines whether the lateral width of the image is larger than printing width of the label 18 (Act 13).

If determining that the lateral width of the image is larger than the printing width of the label 18 (YES in Act 13), the processor 11 rotates the image (Act 14).

If determining that the image included in the printing data is not landscape (NO in Act 12), if determining that the lateral width of the image is equal to or smaller than the printing width of the label 18 (No in Act 13), or after rotating the image (Act 14), the processor 11 enlarges or reduces the image based on the printing width of the label 18 (Act 15).

After enlarging or reducing the image, the processor 11 prints the enlarged or reduced image on the label 18 using the print engine 17.

After printing the enlarged or reduced image on the label 18, the processor 11 ends the operation.

The processor 11 may transmit the printing data including the rotated image to the external apparatus through the communication interface 16. The rotated image may be printed by another apparatus.

The label 18 may not be the belt-like. The label 18 may be cut into a predetermined shape.

The image forming system configured as explained above rotates the image, which is landscape, if the lateral width of the image is larger than the printing width of the label. As a result, the image forming system can appropriately rotate the image.

The image forming system enlarges or reduces the rotated image and thereafter prints the image on the label. As a result, compared with if the image is not rotated, the image forming system can print the image on the label at magnification closer to original magnification.

While certain embodiments have been described, these embodiments have been presented by way of example only, and are not intended to limit the scope of the disclosure. Indeed, the novel apparatus and methods described herein may be embodied in a variety of other forms; furthermore, various omissions, substitutions and changes in the form of the apparatus and methods described herein may be made without departing from the spirit of the disclosure. The accompanying claims and their equivalents are intended to cover such forms or modifications as would fall within the scope and spirit of the disclosure.

What is claimed is:

1. An image processing apparatus comprising:
an interface configured to acquire printing data including an image; and
a processor configured to:
acquire a printing width of a medium wherein the medium is variable in width in a first direction and has a predetermined width in a second direction orthogonal to the first direction and the printing width is the predetermined width in the second direction, wherein the medium is a label, and wherein the label is a sticker;
rotate the image when a lateral width of the image acquired by the interface is larger than a longitudinal width of the image and the lateral width of the image is larger than the printing width of the medium on which the image is printed,
when the lateral width of the image after rotation is greater than the printing width, reduce the image to fit the rotated image in the printing width of the medium,
when the lateral width of the image after rotation is smaller than the printing width, enlarge the image to fit the rotated image in the printing width of the medium, and
operate a print engine to draw out the medium in the first direction according to the longitudinal width of the rotated image, or
when the lateral width of the image acquired by the interface is larger than the longitudinal width of the image and the lateral width of the image is smaller than the printing width of the medium on which the image is printed, enlarge the image to fit the image in the printing width of the medium without rotating the image, and
operate the print engine to draw out the medium in the first direction according to the longitudinal width of the image without rotating the image.

2. The apparatus according to claim 1, wherein, when the image is landscape, the processor determines whether a length of the image in a longitudinal direction is larger than the printing width.

3. The apparatus according to claim 2, wherein the processor is configured to determine, based on the lateral width and the longitudinal width of the image, whether the image is landscape.

4. The apparatus according to claim 1, wherein the processor is configured to rotate the image by 90 degrees.

5. The apparatus according to claim 1, further comprising a printer configured to print the rotated image on the medium.

6. The apparatus according to claim 1, wherein the printing data is a Print Document Format (PDF).

7. An image processing method executed by a processor, the image processing method comprising:
acquiring, at an interface, printing data including an image;
acquiring a printing width of a medium wherein the medium is variable in width in a first direction and has a predetermined width in a second direction orthogonal to the first direction and the printing width is the predetermined width in the second direction, wherein the medium is a label, and wherein the label is a sticker;
rotating the image if a lateral width of the image acquired by the interface is larger than a longitudinal width of the image and the lateral width of the image is larger than the printing width of the medium on which the image is printed;
when the lateral width of the image after rotation is greater than the printing width, reducing the image to fit the rotated image in the printing width of the medium, and
when the lateral width of the image after rotation is smaller than the printing width, enlarging the image to fit the rotated image in the medium,
operating a print engine to draw out the medium in the first direction according to the longitudinal width of the rotated image, or when the lateral width of the image acquired by the interface is larger than the longitudinal width of the image and the lateral width of the image is smaller than the printing width of the medium on which the image is printed, enlarge the image to fit the image in the printing width of the medium without rotating the image, and operating the print engine to draw out the medium in the first direction according to the longitudinal width of the image without rotating the image.

8. The method of claim 7, wherein the printing data is a Print Document Format (PDF).

9. The method according to claim 7 wherein, when the image is landscape, determining whether a length of the image in a longitudinal direction is larger than the printing width.

10. The method according to claim 9, further comprising determining, based on the lateral width and the longitudinal width of the image, whether the image is landscape.

11. The method according to claim 7, wherein the image is rotated by 90 degrees.

* * * * *